(12) United States Patent
Hagen et al.

(10) Patent No.: US 6,581,532 B1
(45) Date of Patent: Jun. 24, 2003

(54) BAFFLE FOR UNIT HOPPER

(75) Inventors: Matthew Brian Hagen, Bettendorf, IA (US); James Irwin Lodico, Hampton, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/021,582

(22) Filed: Dec. 18, 2001

(51) Int. Cl.⁷ .................................................. A01C 7/18
(52) U.S. Cl. ............................ 111/170; 111/63; 111/24
(58) Field of Search ................................ 172/310, 311, 172/452, 482; 111/52, 53, 59, 13, 18, 22, 200, 8, 9, 14, 25, 34, 35, 63, 170, 177, 186, 74, 75, 76, 77, 29

(56) References Cited

U.S. PATENT DOCUMENTS

| | | | |
|---|---|---|---|
| 5,325,800 A | * 7/1994 | Wisor et al. | 111/185 |
| 5,379,706 A | * 1/1995 | Gage et al. | 111/175 |
| 5,398,771 A | * 3/1995 | Hornung et al. | 172/311 |
| 5,765,720 A | * 6/1998 | Stufflebeam et al. | 221/211 |
| 6,164,222 A | * 12/2000 | Mayerle et al. | 111/175 |
| 6,494,154 B2 | * 12/2002 | Kinzenbaw et al. | 111/54 |

* cited by examiner

Primary Examiner—Thomas B. Will
Assistant Examiner—Nathon Mammen

(57) ABSTRACT

A seeding machine having a main seed hopper is in communication with a planting unit by a flexible tube. The planting unit has a horizontal working position and a vertical transport position. The main hopper supplies seed by gravity to the planting unit through the flexible tube. The planting unit comprises a unit hopper and a seed meter. Seed is metered by the seed meter before being discharged to a seed tube and eventually a planting furrow. Seed from the flexible tube passes through the unit hopper to the seed meter. The unit hopper is provided with a baffle. Seed passing through the unit hopper to the seed meter passes beneath the concave surface of the baffle. As the planting unit is pivoted from its horizontal working position to its vertical transport position seed from the seed meter flows over the top of the baffle and is held in the unit hopper. As the planting unit is pivoted back into its horizontal working seed flows back into the seed meter from the unit hopper before seed starts flowing back into the seed meter through the inlet.

14 Claims, 4 Drawing Sheets

BAFFLE FOR UNIT HOPPER

FIELD OF THE INVENTION

The present invention is directed to a baffle used in a planting unit hopper for directing seed from the seed puddle of a seed meter into a unit hopper as the planting unit is rotated from its horizontal working position into its vertical transport position. When the planting unit is rotated back to its horizontal working position seed in the unit hopper flows back into the seed meter before seed in the seed inlet flows back into the seed meter.

BACKGROUND OF THE INVENTION

Row crop planters are seeding machines used to plant row crops. Typically row crop planters are provided with a number of planting units. Each planting unit comprises a seed hopper, a seed meter, a furrow opener with depth gauge wheels, closing wheels, and a seed tube. The seed hopper delivers seed to the seed meter. The seed meter in turn meters the seed and discharges the metered seed to a seed tube. The furrow opener with depth gauge wheels forms a planting furrow of the correct depth. The metered seed is discharged into the planting furrow by the seed tube. The planting furrow is closed by closing wheels that seal the seed in the planting furrow.

Seed meters may be of a mechanical type or pneumatic type. Pneumatic seed meters include vacuum seed meters wherein a vacuum is used to draw seed to a seed disc and positive pressure systems. A mechanical type seed meter is disclosed in U.S. Pat. No. 5,720,233 and a vacuum type seed meter is disclosed in U.S. Pat. No. 4,836,412.

Unit hoppers on planting units have also been supplied seed from a main hopper. An example of such a system is disclosed in U.S. Pat. No. 5,392,722.

In addition, it is also known to seal a seed meter as it is moved from a working position to a transport position. An example of this is disclosed in U.S. Pat. No. 5,325,800.

It is also known to pivot planting units vertically on their noses from a horizontal working position to a vertical working position.

SUMMARY

It is an object of the present invention to provide a baffle assembly in a planting unit that retains seed in the planting unit when the planting unit is pivoted vertically on its nose from its horizontal working position to its vertical transport position.

The baffle assembly holds the seed puddle low enough so that when the row unit is pivoted from its horizontal working position into its vertical transport position the seed from inside the seed meter housing flows into the unit hopper over the baffle. When the row unit is lowered into its horizontal position the seed that flowed out of the seed meter into the unit hopper flows back into the meter housing prior to additional seed entering the meter housing from the inlet.

The planting unit is coupled to a frame having a main seed hopper. The main seed hopper is coupled to the planting unit by a flexible tube. The main hopper supplies seed by gravity to the planting unit through the flexible tube. The planting unit comprises a unit hopper and a seed meter. Seed is metered by the seed meter before being discharged to a seed tube and eventually a planting furrow. Seed from the flexible tube passes through the unit hopper to the seed meter. The unit hopper is provided with a baffle. Seed passing through the unit hopper to the seed meter passes beneath the concave surface of the baffle. The seed forms a seed puddle in the seed meter. As the planting unit is pivoted on its nose to its vertical transport position, seed from the seed puddle is directed into the unit hopper by the convex surface of the baffle, as seed from the seed meter flows back into the unit hopper over the top of the baffle. When the row unit is rotated back to its horizontal working position, the seed originally from the seed meter and held in the unit hopper on top of the baffle flows back into the seed meter before seed starts to flow into the seed meter from the inlet under the baffle.

The unit hopper is made from plastic and is riveted onto the seed meter. The unit hopper is provided with an open top having a detachable cover for removing seed from the unit hopper.

DETAILED DESCRIPTION

Figure 1:
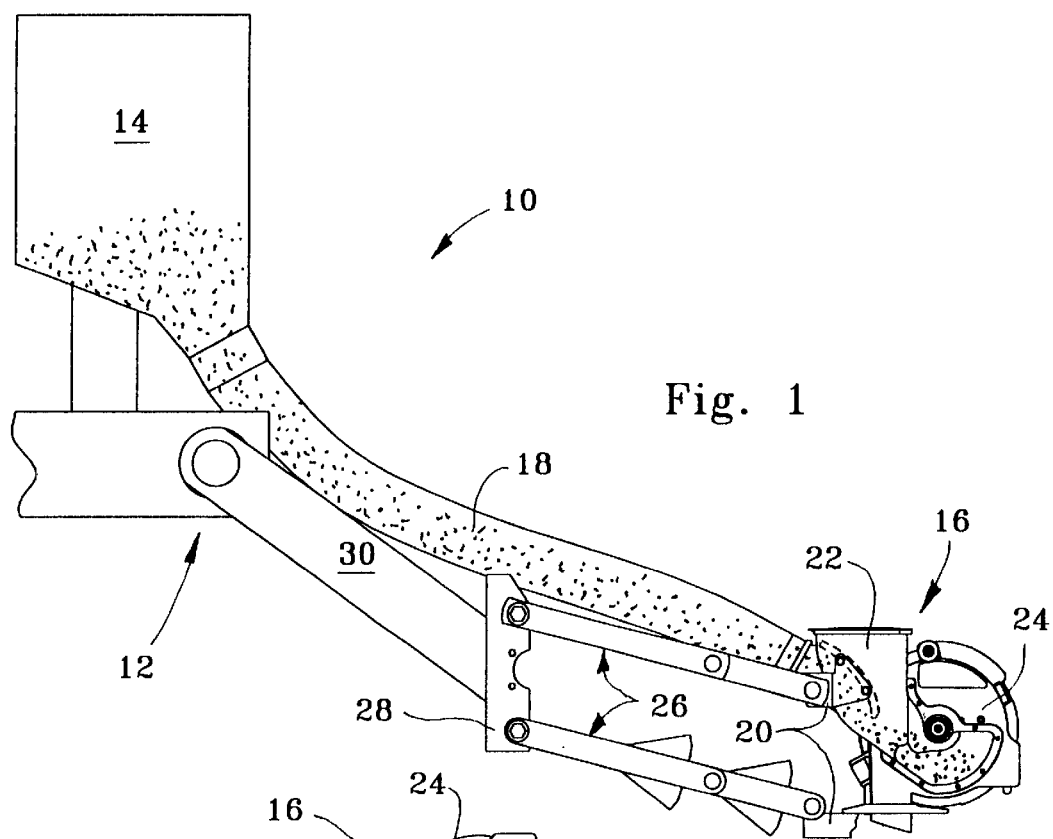
FIG. 1 is a side view of the seeding machine with the planting unit in its horizontal working position.

Seeding machine 10 comprises a frame 12, a main seed hopper 14, a planting unit 16 and a flexible tube 18. Seed contained in the main hopper 14 is transmitted by gravity to the planting unit 16 through the flexible tube 18. The planting unit 16 comprises a planting unit frame 20 on which are mounted unit hopper 22 and a vacuum seed meter 24. Although not illustrated, a furrow opener with depth gauging wheels would also be mounted to the planting unit frame as would a seed tube and closing wheels. The furrow opener would be used to form a planting furrow. The seed tube would direct metered seed from the seed meter 24 to the planting furrow. The closing wheels would close the planting furrow sealing the seed in the furrow. The furrow opener with depth gauging wheels, the seed tube and the closing wheels are conventional and well known in the art.

Figure 2:
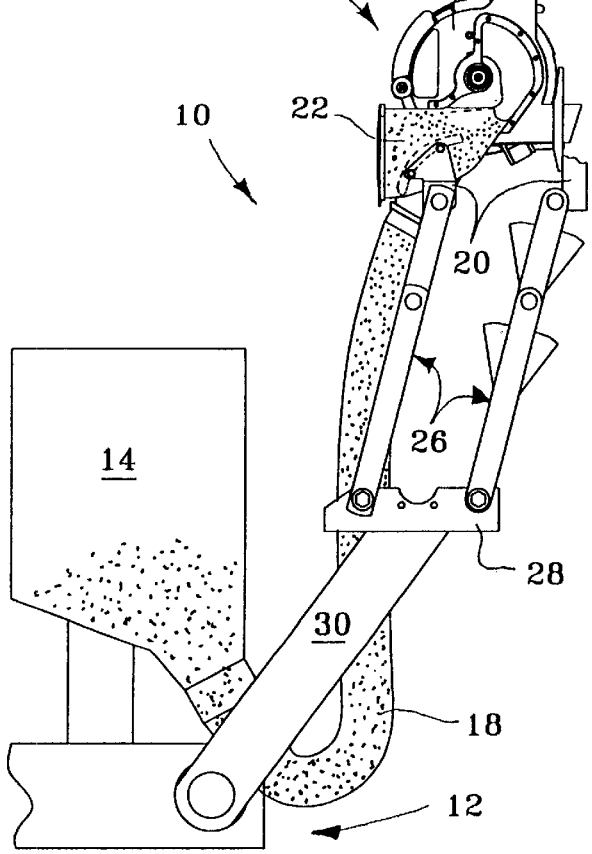
FIG. 2 is a side view of a seeding machine with the planting unit in its vertical transport position.

The planting unit 16, illustrated in FIG. 1, is in its horizontal working position. To reduce the size of the transport package the planting unit 16 can be pivoted into its vertical transport position, as illustrated in FIG. 2. The planting unit is also provided with a four-bar linkage 26 extending between the planting unit frame 20 and mounting plate 28. Mounting plate 28 is mounted to the pivoting mechanism 30 of the frame 12. The four-bar linkage 26 allows the planting unit to follow the ground when it is in its horizontal working position.

Figure 3:
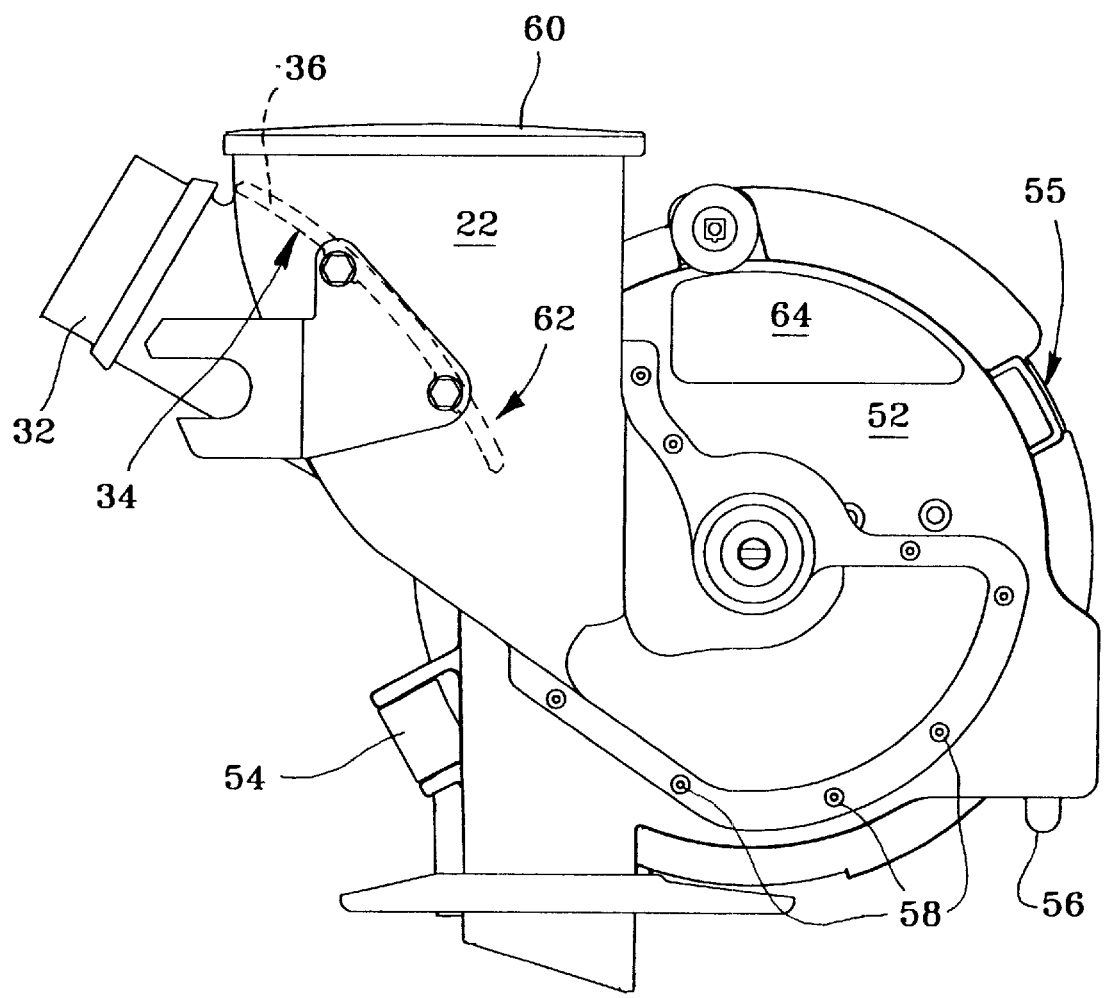
FIG. 3 is a close up side view of the seed meter and unit hopper of the planting unit.
Figure 4:
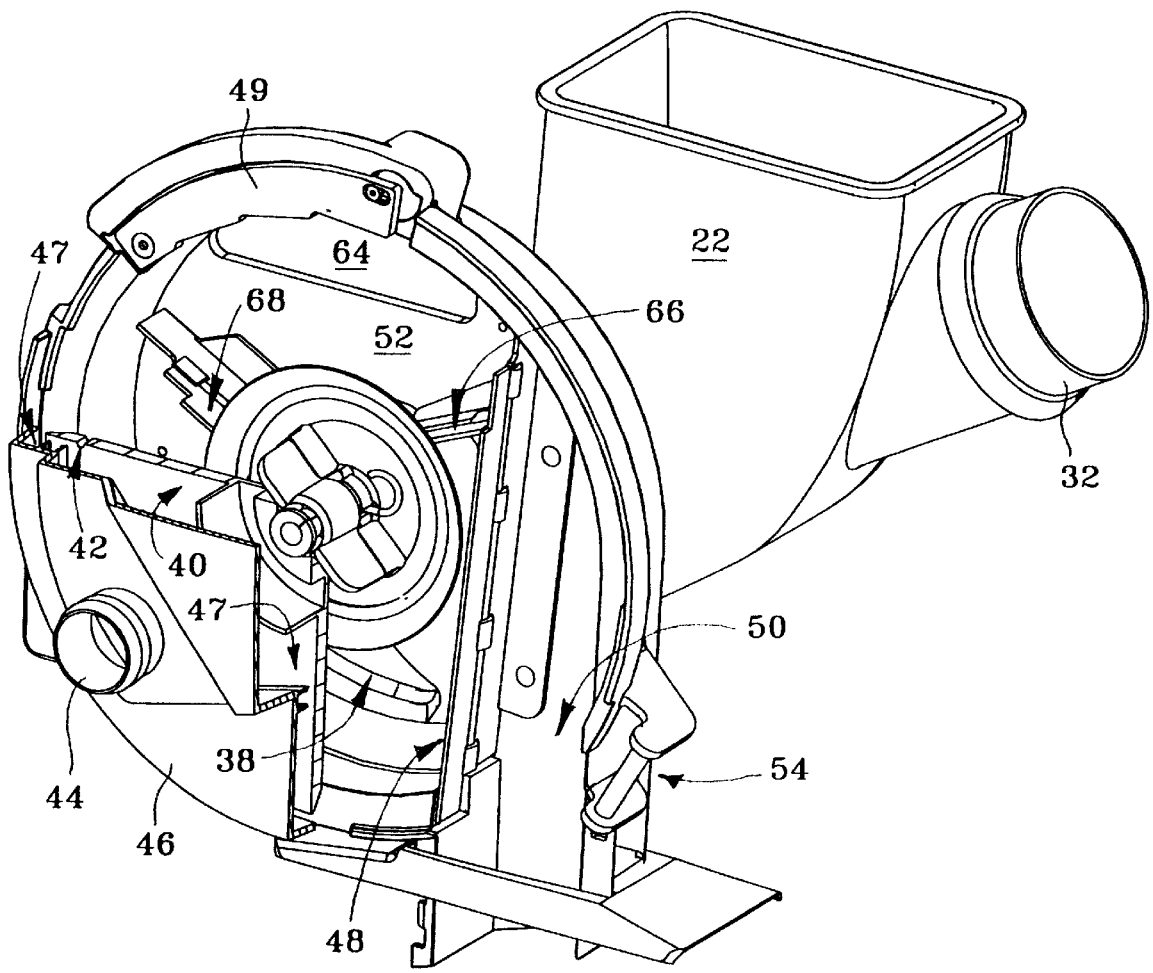
FIG. 4 is a perspective partial cross sectional view of the seed meter and unit hopper of the planter unit.

The inventive features of the planting unit 16 are best illustrated in FIGS. 3 and 4. Seed from the main hopper 14 passes through flexible tube 18 to the unit hopper 22. The unit hopper is provided with an inlet 32, which is coupled to the flexible tube 18. The seed passes beneath the concave surface 34 of baffle 36 and through entrance passage 38 into the seed meter 24. The seed forms a seed puddle against the seed disc 40. The seed disc 40 is a conventional vacuum seed disc being provided with a series of circumferentially spaced apertures 42. Each aperture corresponds to an individual seed cell on the seed disc 40. The seed cells come into contact with seeds located in the seed puddle.

A vacuum is applied to the side of the seed disc 40 opposite from the seed puddle. The vacuum source is typically a fan driven by a hydraulic motor that transmits the vacuum through hoses connected to fitting 44 located on vacuum housing member 46 of the seed meter 24. An air seal 47 is mounted to the vacuum housing member 46. The seal contacts the seed disc forming an air seal therewith. As viewed in FIG. 4 the seed disc rotates in a clockwise direction. The vacuum draws seeds to the seed cells. As the seed cells are rotated through the seed puddle seed attach to the seed cells and are rotated upwardly out of the seed puddle. A double eliminator 49 for knocking extra seeds from the seed cells is located at the top of the seed meter. The single seed containing seed cells are then rotated past brush 48 into discharge area 50. In the discharge area 50 the vacuum is blocked from the apertures 42 by the arrangement of the air seal 47. Terminating the vacuum releases the seed from the seed disc 40. The seed moves downwardly through the discharge area 50 by gravity, out of the seed meter 24 into a seed tube and eventually into the planting furrow.

The vacuum housing member 46 is hingedly coupled to the unit hopper housing member 52 by hinge 54. A latch 55 is located opposite from the hinge 54 and latches the vacuum housing member 46 to the unit hopper housing member 52. The unit hopper housing member 52 is provided with a locating button 56. The locating button 56 facilitates assembly of the seed meter 24 and unit hopper 22 onto the planting unit frame 20.

The unit hopper 22 is plastic and is attached to the unit hopper housing member 52 by fasteners 58. The unit hopper 22 has an open top that is enclosed by detachable cover 60. As the planting unit 16 is pivoted from its horizontal working position to its vertical transport position, seed in the seed meter 24 flows towards the flexible tube 18. Seed from the seed meter 24 flows over the convex surface 62 of the baffle 36 and is held in the unit hopper 22, as shown in FIG. 2.

The top of the of the unit hopper housing member 52 is provided with an opening 64 through which air is drawn by the vacuum seed meter 24. Typically this opening is provided with a clear plastic window having louvers. The louvers allow air to enter the seed meter. The clear plastic window provides an inspection window for the seed meter. The louvered window is not illustrated in the drawings.

Figure 5:
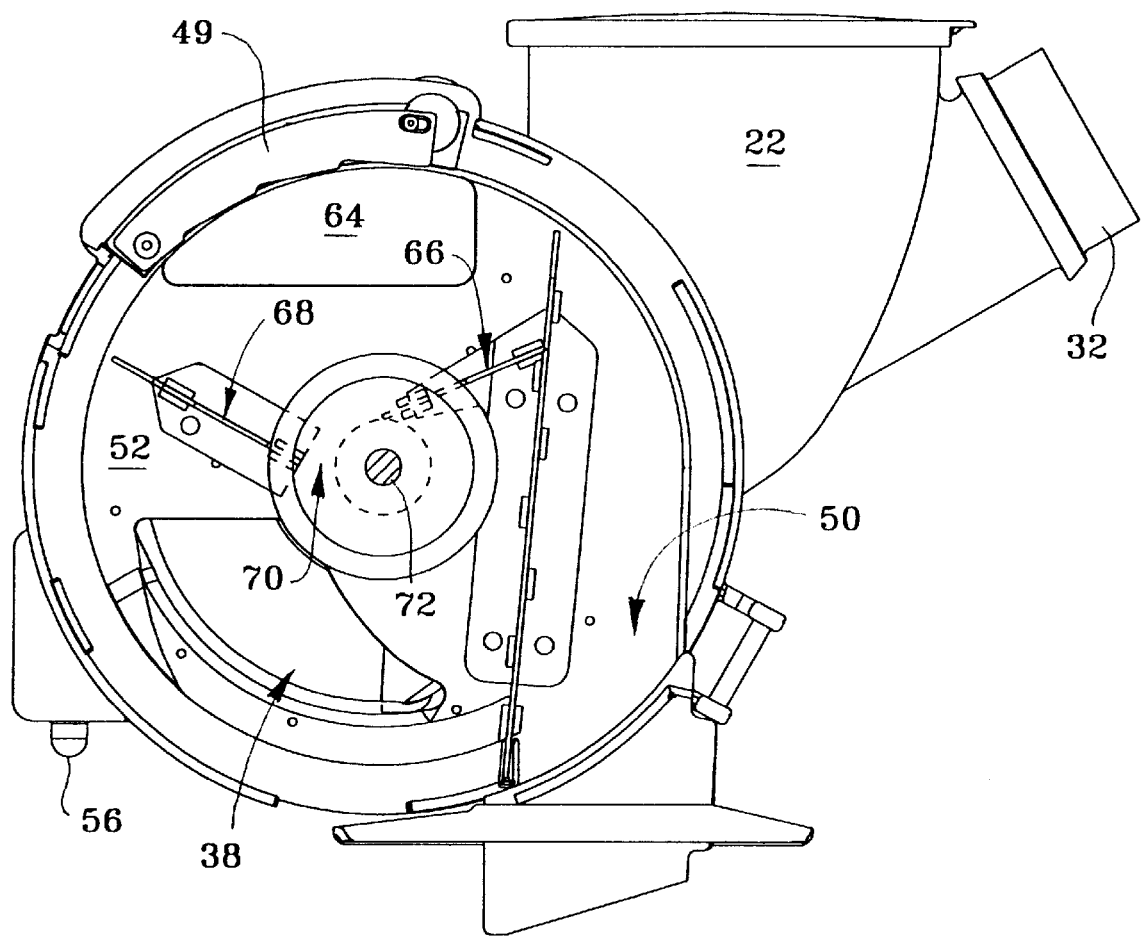
FIG. 5 is a side view of the of the planter unit seed meter housing member illustrating the brush assemblies.

The seed meter is provided with two additional brush assemblies 66 and 68 located between the seed puddle and the opening 64. The first brush 66, as illustrated in FIGS. 4 and 5, extends from the 2:00 o'clock position downward and radially inward to a location above the seed meter drive axle 72. The second brush 68 extends from the 10:00 o'clock position radially inward to a location spaced from the seed meter drive axle. A seed return gap 70 is formed between the drive axle 72 and the second brush 68. The seed return gap 70 is used to return extra seed released from the seed cells by the double eliminator to the seed puddle. As such, both brush assemblies 66 and 68 extend downwardly and inwardly from the outer portions of the seed disc 40 into a V with the seed return gap 70 formed at the apex.

After a seeding operation the vacuum source is turned off releasing seed from the seed disc 40. Seed located above the first and second brushes 66 and 68 is directed to the seed return gap by the brushes.

As the planting unit is pivoted from its horizontal working position to its vertical transport position most of the seed in the seed puddle passes through passage 38 and is deflected by baffle 36 into the unit hopper 22. However, a portion of the seed remains in the seed meter forming a smaller seed puddle against brush 48 and first brush 66, see FIG. 2. Second brush 68 prevents seed in this smaller seed puddle from bouncing out of the seed puddle and falling into the discharge area 50 of the seed meter 24.

Having described the preferred embodiment, it will become apparent that various modifications can be made without departing from the scope of the invention. For example, a mechanical seed meter or a positive pressure pneumatic seed meter may be used in place of the vacuum seed meter disclosed in the specification above. Similarly, the seed can be directed to the individual unit hoppers by a pneumatic seed on demand system from a central hopper, instead of a using the gravity delivery system disclosed in the specification above. Therefore the present invention should be limited solely by the claims that follow.

What is claimed is:

1. A seeding machine comprising:
   a frame;
   a main hopper mounted to the frame;
   a planting unit pivotally mounted to the frame, the planting unit having a horizontal working position and a vertical transport position, the planting unit having a unit hopper and a seed meter for metering seed received from the unit hopper;
   a tube extends between the main hopper and the unit hopper for transmitting seed from the main hopper to the unit hopper, seed transmitted from the main hopper to the seed meter forms a seed puddle in the seed meter when the planting unit is in its horizontal working position;
   a baffle is located in the unit hopper for directing and holding seed, from the seed puddle, in the unit hopper, when the planting unit is pivoted from its horizontal working position to its vertical transport position, the baffle extends transversely across the unit hopper and is angled so that seed held in the unit hopper is returned to the seed meter when the planting unit is pivoted from its vertical transport position to its horizontal working position, the baffle has a convex surface for directing and holding seed in the unit hopper and a concave surface beneath which seed passes from the main hopper to the seed meter.

2. A seeding machine as defined by claim 1 wherein the tube is flexible.

3. A seeding machine as defined by claim 2 wherein the main hopper is located above the planting unit when the planting unit is in its horizontal working position so that seed is fed by gravity through the tube from the main hopper to the planting unit.

4. A seeding machine as defined by claim 3 wherein the unit hopper has an open top that is covered by a detachable cover.

5. A seeding machine as defined by claim 4 wherein the seed meter is a vacuum meter for metering the seed.

6. A seeding machine as defined by claim 5 wherein the planting unit is coupled to the frame by a linkage that allows the planting unit to follow the ground when it is in its horizontal working position.

7. A seeding machine comprising:
   a frame;
   a main hopper mounted to the frame;
   a planting unit pivotally mounted to the frame in communication with the main hopper, the planting unit having a horizontal working position and a vertical transport position, the planting unit having a unit hopper and a seed meter for metering seedl;

a baffle is located in the unit hopper for directing and holding seed from the seed meter in the unit hopper, when the planting unit is pivoted from its horizontal working position to its vertical transport position, the baffle extends transversely across the unit hopper and is angled so that seed held in the unit hopper is returned to the seed meter when the planting unit is pivoted from its vertical transport position to its horizontal working position, the baffle has a convex surface for directing and holding seed in the unit hopper and a concave surface beneath which seed passes from the main hopper to the seed meter.

8. A seeding machine as defined by claim 7 wherein the main hopper is located above the planting unit when the planting unit is in its horizontal working position so that seed is fed by gravity from the main hopper to the planting unit.

9. A seeding machine as defined by claim 8 wherein the unit hopper has an open top that is covered by a detachable cover.

10. A seeding machine as defined by claim 9 wherein the seed meter is a vacuum meter for metering the seed.

11. A seeding machine as defined by claim 10 wherein the planting unit is coupled to the frame by a linkage that allows the planting unit to follow the ground when it is in its horizontal working position.

12. A planting unit for a seeding machine, the planting unit comprising:

a planting unit frame, a unit hopper mounted to the planting frame, the unit hopper having an inlet for receiving seed;

a seed meter is mounted to the planting frame, the seed meter meters seed received from the unit hopper;

a baffle is located in the unit hopper for retaining seed from the seed meter in the unit hopper, when the planting unit is pivoted from a horizontal working position to a vertical transport position, the baffle is angled so that seed held in the unit hopper is returned to the seed meter when the planting unit is pivoted from its vertical transport position to its horizontal working position, the baffle has a convex surface for directing and holding seed in the unit hopper and a concave surface beneath which seed passes from the main hopper to the seed meter.

13. A planting unit as defined by claim 12 wherein the unit hopper has an open top that is covered by a detachable cover.

14. A planting unit as defined by claim 13 wherein the seed meter is a vacuum meter for metering the seed.

* * * * *